US012670700B2

(12) United States Patent
Choi et al.

(10) Patent No.: US 12,670,700 B2
(45) Date of Patent: Jun. 30, 2026

(54) ACTIVE DATA COLLECTION, SAMPLING, AND GENERATION FOR USE IN TRAINING MACHINE LEARNING MODELS FOR AUTOMOTIVE OR OTHER APPLICATIONS

(71) Applicant: Canoo Technologies Inc., Torrance, CA (US)

(72) Inventors: Jongmoo Choi, Gardena, CA (US); Kilsoo Kim, Hermosa Beach, CA (US); Qi Peng, Torrance, CA (US); Lei Cao, Torrance, CA (US); Mayukh Sattiraju, Redondo Beach, CA (US); Shanmukha M. Bhumireddy, Torrance, CA (US); Emilio Aron Moyers Barrera, Torrance, CA (US); Phillip Vu, Calabasas, CA (US)

(73) Assignee: WHS ENERGY SOLUTIONS, LLC, Argyle, TX (US)

( * ) Notice: Subject to any disclaimer, the term of this patent is extended or adjusted under 35 U.S.C. 154(b) by 282 days.

(21) Appl. No.: 17/660,973

(22) Filed: Apr. 27, 2022

(65) Prior Publication Data

US 2023/0351736 A1     Nov. 2, 2023

(51) Int. Cl.
G06V 10/774 (2022.01)
G06V 20/56 (2022.01)
G06V 20/59 (2022.01)

(52) U.S. Cl.
CPC .......... G06V 10/7753 (2022.01); G06V 20/56 (2022.01); G06V 20/59 (2022.01)

(58) Field of Classification Search
CPC .... G06V 10/7753; G06V 10/82; G06V 20/56; G06V 20/59; G06V 20/58
See application file for complete search history.

(56) References Cited

U.S. PATENT DOCUMENTS

| | | | |
|---|---|---|---|
| 2018/0012082 A1* | 1/2018 | Satazoda | G06V 10/763 |
| 2019/0156151 A1* | 5/2019 | Wrenninge | G06F 18/214 |
| 2019/0171428 A1* | 6/2019 | Patton | G06F 8/60 |
| 2020/0065711 A1 | 2/2020 | Clement et al. | |
| 2020/0387797 A1* | 12/2020 | Ryan | G06N 3/084 |

(Continued)

OTHER PUBLICATIONS

Kishore et al, Synthetic Data Generation using Imitation Training, 2021 IEEE CVF International Conference on Computer Vision Workshops, pp. 1-10. (Year: 2021).*

(Continued)

*Primary Examiner* — Kathleen M Broughton
(74) *Attorney, Agent, or Firm* — ALLEN, DYER, DOPPELT, + GILCHRIST, P.A.

(57) ABSTRACT
A method includes identifying one or more edge cases associated with at least one trained machine learning model, where the at least one trained machine learning model is configured to perform at least one function related to one or more vehicles. The method also includes obtaining raw data associated with the one or more edge cases from at least one of the one or more vehicles and selecting a subset of the raw data. The method further includes generating synthetic data associated with the one or more edge cases. In addition, the method includes at least one of: retraining the at least one trained machine learning model and training at least one new machine learning model using the selected subset of raw data and the synthetic data.

22 Claims, 5 Drawing Sheets

(56) References Cited

U.S. PATENT DOCUMENTS

| | | | |
|---|---|---|---|
| 2021/0309248 A1 | 10/2021 | Choe et al. | |
| 2022/0101053 A1* | 3/2022 | Litvak | G06V 10/774 |
| 2022/0122001 A1* | 4/2022 | Choe | G06N 20/20 |
| 2022/0164602 A1* | 5/2022 | Frtunikj | G06V 10/774 |
| 2022/0335328 A1* | 10/2022 | Frosch | G16H 50/70 |

OTHER PUBLICATIONS

Kishore et al, Synthetic Data Generation using Imitation Training, 2021, 2021 IEEE/CVF International Conference on Computer Vision Workshops, pp. 1-10. (Year: 2021).*
Tewari et al., "State of the Art on Neural Rendering," Eurographics 2020, STAR—State of the Art Report, vol. 39, No. 2, 27 pages.
Wood et al., "Fake it till you make it: face analysis in the wild using synthetic data alone," 2021 IEEE/CVF International Conference on Computer Vision (ICCV), Oct. 5, 2021, 11 pages.
Zhu, "Active Learning with Sampling by Uncertainty and Density for Data Annotations ," IEEE Transactions on Audio, Speech, and Language Processing, vol. 18, No. 6, Aug. 2010, 9 pages.
Sharma et al., "Evidence-Based Uncertainty Sampling for Active Learning," Data Mining and Knowledge Discovery, vol. 31, Apr. 13, 2016, 36 pages.
Susmelj, "Active Learning using Detectron2," Lightly Inc., Jun. 2021, 6 pages.
Wikipedia, "Nelder-Mead method," Apr. 8, 2022, 6 pages.
International Search Report and Written Opinion of the International Searching Authority dated Jul. 17, 2023, in connection with International Application No. PCT/US2023/016594, 12 pages.

* cited by examiner

ACTIVE DATA COLLECTION, SAMPLING, AND GENERATION FOR USE IN TRAINING MACHINE LEARNING MODELS FOR AUTOMOTIVE OR OTHER APPLICATIONS

TECHNICAL FIELD

This disclosure relates generally to machine learning systems. More specifically, this disclosure relates to active data collection, sampling, and generation for use in training machine learning models for automotive or other applications.

BACKGROUND

Camera perception operations are often used to support various functions in autonomous applications, such as in vehicles supporting advanced driving assist system (ADAS) or autonomous driving (AD) features, or other applications. Example types of camera perception operations that may be performed for a vehicle can include object detection, object classification, semantic segmentation, interesting point detection, and pose estimation. Object detection functions and object classification functions generally involve respectively identifying and classifying objects in images of scenes captured by one or more cameras of a specified vehicle, such as by identifying other vehicles, cyclists, pedestrians, trees, and other objects around the specified vehicle. Semantic segmentation functions generally involve classifying portions of images of scenes captured by one or more cameras of a specified vehicle, such as by determining whether pixels or other portions of the images are associated with other vehicles, cyclists, pedestrians, trees, other objects, or scene backgrounds. Interesting point detection functions generally involve identifying specific types of points within images of scenes captured by one or more cameras of a specified vehicle, such as by detecting the closest point of another vehicle to the specified vehicle. Pose estimation functions generally involve using images of scenes captured by one or more cameras of a specified vehicle to identify other vehicles' three-dimensional orientations in space around the specified vehicle.

SUMMARY

This disclosure relates to active data collection, sampling, and generation for use in training machine learning models for automotive or other applications.

In a first embodiment, a method includes identifying one or more edge cases associated with at least one trained machine learning model, where the at least one trained machine learning model is configured to perform at least one function related to one or more vehicles. The method also includes obtaining raw data associated with the one or more edge cases from at least one of the one or more vehicles and selecting a subset of the raw data. The method further includes generating synthetic data associated with the one or more edge cases. In addition, the method includes at least one of: retraining the at least one trained machine learning model and training at least one new machine learning model using the selected subset of raw data and the synthetic data.

In a second embodiment, an apparatus includes at least one processing device configured to identify one or more edge cases associated with at least one trained machine learning model, where the at least one trained machine learning model is configured to perform at least one function related to one or more vehicles. The at least one processing device is also configured to obtain raw data associated with the one or more edge cases from at least one of the one or more vehicles and select a subset of the raw data. The at least one processing device is further configured to generate synthetic data associated with the one or more edge cases. In addition, the at least one processing device is configured to at least one of: retrain the at least one trained machine learning model and train at least one new machine learning model using the selected subset of raw data and the synthetic data.

In a third embodiment, a non-transitory machine-readable medium contains instructions that when executed cause at least one processor to identify one or more edge cases associated with at least one trained machine learning model, where the at least one trained machine learning model is configured to perform at least one function related to one or more vehicles. The medium also contains instructions that when executed cause the at least one processor to obtain raw data associated with the one or more edge cases from at least one of the one or more vehicles and select a subset of the raw data. The medium further contains instructions that when executed cause the at least one processor to generate synthetic data associated with the one or more edge cases. In addition, the medium contains instructions that when executed cause the at least one processor to at least one of: retrain the at least one trained machine learning model and train at least one new machine learning model using the selected subset of raw data and the synthetic data.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
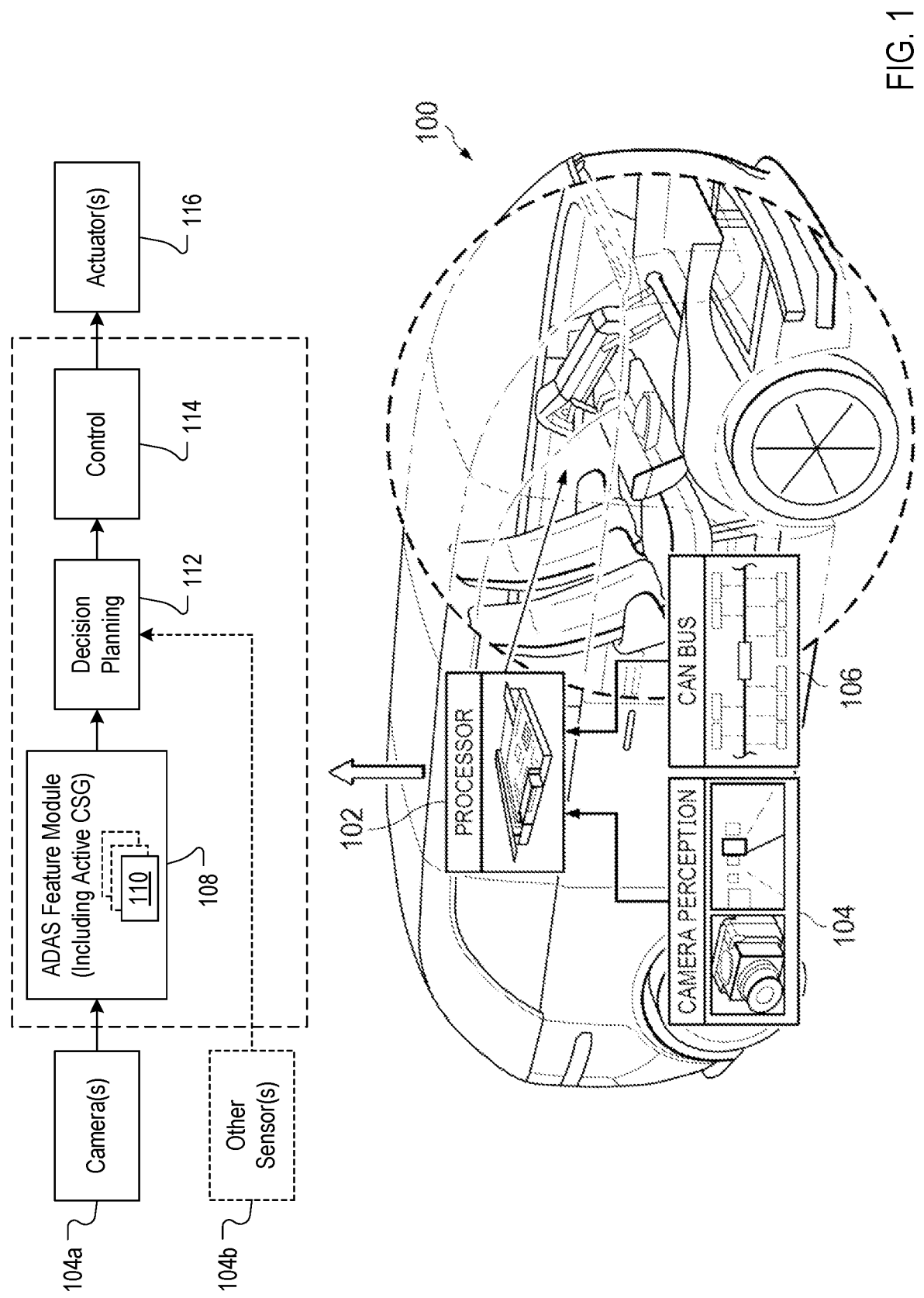
FIG. 1 illustrates an example vehicle supporting active data collection, sampling, and generation for use in training at least one machine learning model according to this disclosure.

FIGS. 1 through 6, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, camera perception operations are often used to support various functions in autonomous applications, such as in vehicles supporting advanced driving assist system (ADAS) or autonomous driving (AD) features, or other applications. Example types of camera perception operations that may be performed for a vehicle can include object detection, object classification, semantic segmentation, interesting point detection, and pose estimation. Object detection functions and object classification functions generally involve respectively identifying and classifying objects in images of scenes captured by one or more cameras of a specified vehicle, such as by identifying other vehicles, cyclists, pedestrians, trees, and other objects around the specified vehicle. Semantic segmentation functions generally involve classifying portions of images of scenes captured by one or more cameras of a specified vehicle, such as by determining whether pixels or other portions of the images are associated with other vehicles, cyclists, pedestrians, trees, other objects, or scene backgrounds. Interesting point detection functions generally involve identifying specific types of points within images of scenes captured by one or more cameras of a specified vehicle, such as by detecting the closest point of another vehicle to the specified vehicle. Pose estimation functions generally involve using images of scenes captured by one or more cameras of a specified vehicle to identify other vehicles' three-dimensional orientations in space around the specified vehicle.

Advanced camera perception technologies often use data-driven machine learning approaches with complex machine learning models. A machine learning model can have many tunable parameters, possibly numbering in the millions or more, that need to be optimized during a training process. Often times, the training process for a machine learning model involves the use of a large collection of labeled training data, meaning training data with labels that identify the correct outputs to be generated by the machine learning model. The accuracy of a trained machine learning model generally depends on the training data used to train the machine learning model, the structure of the machine learning model itself, and the training algorithm(s) used to train the machine learning model. In many cases, given a fixed-size training dataset, the accuracy of a machine learning model will be saturated after finding optimal parameters for the machine learning model based on that training dataset. In order to improve the accuracy of the machine learning model, it may be possible to add additional training data points to the previously-used training dataset, which allows retraining of the machine learning model or training of a new machine learning model using a larger amount of training data.

Unfortunately, this strategy does not scale well, which means that the improvements to a machine learning model's accuracy that can be obtained typically decreases as the size of the training dataset increases due to training efficiency issues. To address these types of problems, the concept of "active learning" has been proposed, where a new training dataset is obtained from a collection of raw data in order to include more-efficient training data within the training dataset. However, current active learning approaches can suffer from various shortcomings. For instance, it may take a prolonged period of time for current active learning approaches to obtain adequate additional training data for use in an expanded training dataset. This is generally due to these approaches attempting to identify relevant additional training data from a set collection of data.

This disclosure provides techniques supporting active data collection, active data sampling, and active data generation for use in training machine learning models for automotive or other applications. As described in more detail below, a vehicle or other device or system (such as a cloud-based service) can process information used, generated, or collected by the vehicle (and possibly multiple vehicles) in order to support active data collection, active data sampling, and active data generation. Active data collection refers to the collection of real-world information that has been identified as being related to one or more "edge cases," such as one or more instances where a machine learning model used by a vehicle generates incorrect results or results with low confidence (such as a confidence below a threshold value). Active data sampling refers to the sampling or selection of at least some of the real-world information that has been collected. Active data generation refers to the creation of synthetic or artificial training data, which can be based on the one or more edge cases. The actively-sampled data and the actively-generated data can be used as training data, such as when this data is added to a previously-used training dataset or used to at least partially form a new training dataset. The vehicle or other device or system can also support various processes that enable effective cooperation of the active data collection, active data sampling, and active data generation operations and that enable effective curation of both real-world and synthetic training data for inclusion in one or more training datasets.

As a particular example usage of these techniques, a vehicle or other device or system can be used to collect real-world data, sample the real-world data by selecting a subset of the real-world data, and label the sampled data (such as by using a manual or automated labeling pipeline). The vehicle or other device or system can also create and manage one or more training datasets that are at least partially formed using the labeled data. The one or more training datasets can be used to train one or more machine learning models, and one or more validation datasets (which may be based on or extracted from the training dataset or datasets) can be used to test the one or more trained machine learning models. Any instances where the one or more trained machine learning models perform poorly or inaccurately can be identified as edge cases, and the processes for active data collection, active data sampling, and active data generation can be performed based on those identified edge cases. Additional training data can therefore be obtained based on the active data collection, active data sampling, and active data generation operations. This additional training data can be included in at least one training dataset and used to retrain the one or more existing machine learning models or to train one or more new machine learning models. Ideally, the retrained or new machine learning model(s) can perform better and have improved accuracy compared to the original machine learning model(s), particularly as the performance relates to the identified edge cases.

In this way, these techniques can be used to improve the collection, sampling, and generation of training data for machine learning models. In some cases, these techniques allow additional training data to be obtained over time and used to train or retrain machine learning models in order to significantly improve the accuracy of the machine learning models over time. In particular embodiments, these techniques may be used continuously, periodically, intermittently, on demand, or at any other suitable time(s) in order to obtain additional training data for use with one or more machine learning models. Moreover, these techniques can be used to obtain additional training data with reduced or minimal data collection, sampling, or generation resources. Thus, for instance, the number of personnel, the amount of personnel time, the amount of computing resources, or other resources used for data collection, sampling, or generation functions can be reduced, which can result in significant time and cost savings.

Note that the machine learning models that are trained using these techniques may be used for any suitable camera perception purposes or other purposes. Example types of camera perception operations that may be performed for a vehicle using one or more machine learning models trained using data obtained via active data collection, active data sampling, and active data generation can include object detection, object classification, semantic segmentation, interesting point detection, and pose estimation, which are described above. Another example type of camera perception operation that may be performed for a vehicle using one or more machine learning models trained using data obtained via active data collection, active data sampling, and active data generation can include driver monitoring. Driver monitoring functions may use at least one camera pointed at or otherwise capturing images of a driver of a vehicle in order to identify one or more characteristics associated with the driver, such as to identify where the driver is looking. Also note that any suitable types of machine learning models may be trained using data obtained via active data collection, active data sampling, and active data generation, such as deep neural networks, other deep learning models, or other machine learning models.

FIG. 1 illustrates an example vehicle 100 supporting active data collection, sampling, and generation for use in training at least one machine learning model according to this disclosure. In this particular example, the vehicle 100 takes the form of an automotive vehicle, such as an electric or other passenger vehicle. However, any other suitable vehicle may be used to support active data collection, sampling, and generation for use in training at least one machine learning model. In this particular example, the vehicle 100 has the form of a passenger van, but other forms may be used by the vehicle 100, such as a sedan, pickup truck, sport utility vehicle, box van, or semi tractor form.

As shown in FIG. 1, the vehicle 100 includes at least one processor 102 configured to control one or more operations of the vehicle 100. In this example, the processor 102 may interact with one or more sensors 104 supporting at least one camera perception function and with one or more components coupled to a bus 106. In this particular example, the one or more sensors 104 include one or more cameras 104*a* or other imaging sensors, and the bus 106 represents a controller area network (CAN) bus. However, the processor 102 may interact with any additional sensor(s) and communicate over any other or additional bus(es). In some cases, the sensors 104 may include a single externally-directed camera 104*a*, such as one camera positioned on the front of the vehicle 100. In other cases, the sensors 104 may include multiple externally-directed cameras 104*a*, such as one camera positioned on the front of the vehicle 100, one camera positioned on the rear of the vehicle 100, and two cameras positioned on opposite sides of the vehicle 100. In still other cases, the sensors 104 may include one or more internally-directed cameras 104*a*, such as one or more cameras directed towards the driver of the vehicle 100. Any suitable combination of cameras 104*a* may also be used with the vehicle 100, such as one or more internally-directed cameras 104*a* and one or more externally-directed cameras 104*a*.

The one or more cameras 104*a* are configured to generate images of scenes around the vehicle 100 or images of scenes within the vehicle 100. Note that additional types of sensors 104*b* may also be used to provide other information for use by the processor 102, such as one or more radio detection and ranging (RADAR) sensors, light detection and ranging (LIDAR) sensors, other types of imaging sensors, or inertial measurement units (IMUs). Measurements or other data from the sensors 104 can be used by the processor 102 or other component(s) of the vehicle 100 to control various operations of the vehicle 100. Measurements or other data from the sensors 104 can also be used by the processor 102 or other component(s) of the vehicle 100 or by an external device or system to perform various functions related to machine learning model training as described below.

In this example, the processor 102 can process the information from the sensors 104 in order to perform one or more camera perception functions, such as object detection, object classification, semantic segmentation, interesting point detection, pose estimation, or driver monitoring functions. As particular examples, the processor 102 can process the information from the sensors 104 in order to detect objects around or proximate to the vehicle 100, such as one or more vehicles, obstacles, or people near the vehicle 100. The processor 102 can also process the information from the sensors 104 in order to perceive lane-marking lines or other markings on a road, floor, or other surface. The processor 102 can further use various information to generate predictions associated with the vehicle 100, such as to predict the future path(s) of the vehicle 100 or other vehicles, identify a center of a lane in which the vehicle 100 is traveling, or predict the future locations of objects around the vehicle 100. These predictions can be used by the processor 102 to control the travel path of the vehicle 100. As another particular example, the processor 102 can process the information from the sensors 104 in order to detect where the driver of the vehicle 100 is looking.

In the illustrated example, one or more camera perception functions can be performed using an ADAS feature module 108, which can use one or more trained machine learning models 110 to perform the camera perception function(s). For example, the ADAS feature module 108 may use one or more trained machine learning models 110 to identify objects around the vehicle 100, classify objects around the vehicle 100, segment images captured by the camera(s) 104*a*, identify one or more points in images captured by the camera(s) 104*a*, identify three-dimensional orientations of objects in space around the vehicle 100, or identify one or more characteristics of the driver of the vehicle 100. In general, the ADAS feature module 108 may use one or more trained machine learning models 110 to perform any desired camera perception function(s) or other function(s) for the vehicle 100. As described in more detail below, the ADAS feature module 108 may also support operations related to active collection, sampling, and generation (CSG) in order to collect additional training data. The additional training data can be used for retraining at least one of the one or more machine learning models 110 or for training at least one new machine learning model 110 for use by the vehicle 100. Depending on the implementation, the processor 102 may or may not be responsible for actually performing the model training or retraining using the additional training data.

In some embodiments, information from the ADAS feature module 108 (and optionally information from one or more other sources) may be provided to a decision planning function 112, which generally uses this information to determine how to adjust the operation of the vehicle 100. For example, the decision planning function 112 may determine whether (and how) to change the steering direction of the vehicle 100, whether (and how) to apply the brakes or accelerate the vehicle 100, or whether (and how) to trigger an audible, visible, haptic, or other warning. The warning may indicate that the vehicle 100 is near another vehicle, obstacle, or person, is departing from a current traffic lane in which the vehicle is traveling, or is approaching a possible impact location with another vehicle, obstacle, or person. The warning may alternatively indicate that the driver of the vehicle 100 has not been looking ahead or in another suitable direction for at least a threshold amount of time. As particular examples, the decision planning function 112 may operate to implement changes to adaptive cruise control or to trigger emergency braking or evasive steering. In general, the identified adjustments determined by the decision planning function 112 can vary widely based on the specific application.

Also, in some embodiments, the decision planning function 112 can interact with one or more control functions 114, each of which can be used to adjust or control the operation of one or more actuators 116 in the vehicle 100. For example, the one or more actuators 116 may represent one or more brakes, electric motors, or steering components of the vehicle 100, and the control function(s) 114 can be used to apply or discontinue application of the brakes, speed up or slow down the electric motors, or change the steering direction of the vehicle 100. In general, the specific way(s) in which operation of the vehicle 100 can be adjusted may vary depending on the specific vehicle 100 being used.

Note that the module 108 and functions 112-116 shown in FIG. 1 and described above may be implemented in any suitable manner in the vehicle 100. For example, in some embodiments, various ones of the module 108 and functions 112-116 may be implemented or supported using one or more software applications or other software instructions that are executed by at least one processor 102. In other embodiments, at least some of the module 108 and functions 112-116 can be implemented or supported using dedicated hardware components. In general, the module 108 and functions 112-116 described above may be performed using any suitable hardware or any suitable combination of hardware and software/firmware instructions. Also note that any suitable number(s) and type(s) of machine learning models 110 may be used by the vehicle 100, such as one or more deep neural networks, other deep learning models, or other machine learning models.

The processor 102 itself may also be implemented in any suitable manner, and the vehicle 100 may include any suitable number(s) and type(s) of processors or other processing devices in any suitable arrangement. Example types of processors 102 that may be used here include one or more microprocessors, microcontrollers, digital signal processors (DSPs), application specific integrated circuits (ASICs), field programmable gate arrays (FPGAs), or discrete circuitry. Each processor 102 may also have any suitable number of processing cores or engines. In some cases, multiple processors 102 or multiple processing cores or engines in one or more processors 102 may be used to implement the module 108 and functions 112-116 described above. This may allow, for instance, the processor(s) 102 to be used to process multiple images and other sensor data in parallel or to perform various operations described in this patent document above and below in parallel.

Although FIG. 1 illustrates one example of a vehicle 100 supporting active data collection, sampling, and generation for use in training at least one machine learning model, various changes may be made to FIG. 1. For example, various functions and components shown in FIG. 1 may be combined, further subdivided, replicated, omitted, or rearranged and additional functions and components may be added according to particular needs. Also, as noted above and as described in more detail below, at least some of the functionality related to active data collection, sampling, and generation may be performed external to the vehicle 100, such as when at least some of this functionality is performed by an external cloud-based service or other external device or system.

Figure 2:
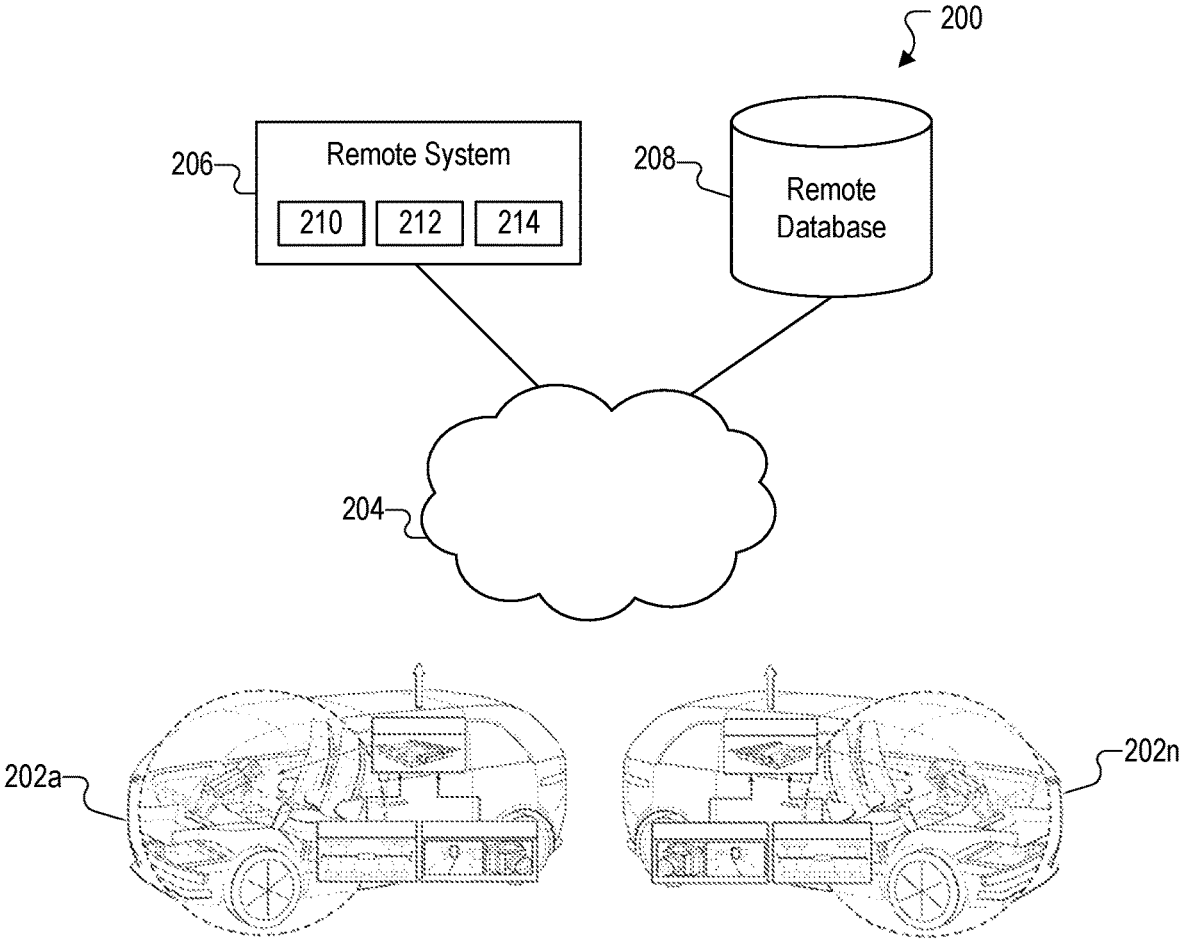
FIG. 2 illustrates an example system supporting active data collection, sampling, and generation for use in training at least one machine learning model according to this disclosure.

FIG. 2 illustrates an example system 200 supporting active data collection, sampling, and generation for use in training at least one machine learning model according to this disclosure. As shown in FIG. 2, the system 200 may include or be used in conjunction with a number of vehicles 202a-202n, each of which may include at least some of the functionality shown in FIG. 1 and described above. For example, each vehicle 202a-202n may include one or more cameras 104a, a decision planning function 112, one or more control functions 114, and one or more actuators 116. Each vehicle 202a-202n may also include an ADAS feature module 108 that uses one or more machine learning models 110 to perform one or more camera perception functions or other functions. However, in this example, the active data collection, sampling, and generation operations may be performed outside of the vehicles 202a-202n.

In this example, each vehicle 202a-202n is configured to communicate over a network 204 with a remote system 206, which may operate in conjunction with a remote database 208. The network 204 represents any suitable communication network or networks over which data related to the vehicles 202a-202n may be transported to and from the vehicles 202a-202n. For example, the network 204 may represent one or more local area networks (LANs), wide area networks (WANs), cellular communication networks, the Internet, or a combination of networks. The remote system 206 represents a remote server, a cloud-based system, or other device or system that can process data from the vehicles 202a-202n. The database 208 represents any suitable storage that can store and facilitate retrieval of data obtained from the vehicles 202a-202n or data generated by the remote system 206. For instance, the remote system 206 may receive images or other information captured by cameras 104a of the vehicles 202a-202n, engage in active collection/sampling/generation to obtain additional training data from one or more of the vehicles 202a-202n, and train one or more machine learning models 110 for use by one or more of the vehicles 202a-202n.

Because the remote system 206 can communicate with a potentially large number of vehicles 202a-202n, the remote system 206 may be able to obtain a large quantity of training data via the active collection/sampling/generation operations. This may conceivably allow the remote system 206 to obtain a wide variety of training data associated with the vehicles 202a-202n, including much more data than would ordinarily be obtainable using a single vehicle 100. As a result, the remote system 206 could be used to generate machine learning models 110 that are more accurate over a wide range of possible vehicle environments or drivers. However, either a vehicle-specific approach as shown in FIG. 1 or a multi-vehicle approach as shown in FIG. 2 may be used as described below to perform active collection, sampling, and generation operations in order to support the training of one or more machine learning models 110 for at least one vehicle.

The remote system 206 may be implemented in any suitable manner to support active data collection, sampling, and generation operations. In some embodiments, the remote system 206 may include one or more processing devices 210, one or more storage devices 212, and one or more communication interfaces 214. The one or more processing devices 210 include any suitable number(s) and type(s) of processors or other processing devices in any suitable arrangement, such as one or more microprocessors, microcontrollers, DSPs, ASICs, FPGAs, or discrete circuitry. The one or more storage devices 212 include any suitable structure(s) configured to store and facilitate retrieval of information, such as at least one random access memory, read only memory, Flash memory, hard drive, or optical disc. The one or more communication interfaces 214 include any suitable structure(s) configured to communicate over at least one physical or wireless communication link, such as an Ethernet interface or a wireless transceiver.

Although FIG. 2 illustrates one example of a system 200 supporting active data collection, sampling, and generation for use in training at least one machine learning model, various changes may be made to FIG. 2. For example, various components shown in FIG. 2 may be combined, further subdivided, replicated, omitted, or rearranged and additional functions and components may be added according to particular needs. Also, the system 200 could be used with any suitable number(s) and type(s) of vehicles 202a-202n.

Figure 3:
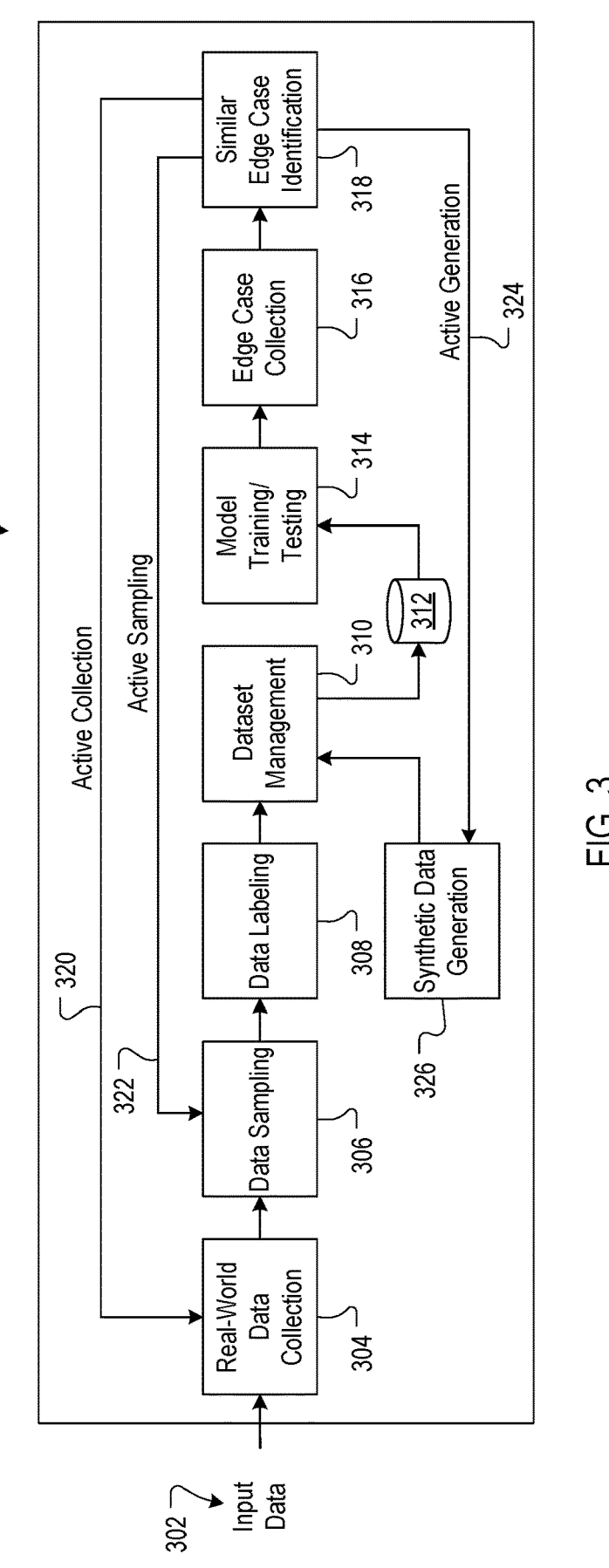
FIG. 3 illustrates an example architecture supporting active data collection, sampling, and generation for use in training at least one machine learning model according to this disclosure.

FIG. 3 illustrates an example architecture 300 supporting active data collection, sampling, and generation for use in training at least one machine learning model according to this disclosure. For ease of explanation, the architecture 300 shown in FIG. 3 may be described as being used to at least partially implement the functionality of the ADAS feature module 108 in the vehicle 100 shown in FIG. 1 or to at least partially implement the functionality of the remote system 206 shown in FIG. 2. However, the architecture 300 shown in FIG. 3 may be implemented in any other suitable manner and used in any other suitable device or system.

As shown in FIG. 3, the architecture 300 generally operates to receive and process input data 302. The input data 302 represents any suitable type(s) of image data or other input data obtained using one or more sensors 104 of one or more vehicles 100, 202a-202n. For example, the input data 302 may include images of scenes in front of one or more vehicles 100, 202a-202n, to the side(s) of one or more vehicles 100, 202a-202n, to the rear of one or more vehicles 100, 202a-202n, or within the interior(s) of one or more vehicles 100, 202a-202n as captured using one or more cameras 104a. Each image may have any suitable resolution and include data in any suitable wavelength range, such as when each image contains visible, infrared, or ultraviolet image data.

The input data 302 is provided to a real-world data collection function 304, which generally operates to collect real-world raw data associated with one or more vehicles 100, 202a-202n. For example, with respect to captured images of scenes around the vehicle(s) 100, 202a-202n, the data collection function 304 may collect captured images and optionally related data associated with the vehicle(s) 100, 202a-202n in different environmental conditions, such as at different times (and therefore under different lighting conditions) and in different weather conditions. With respect to captured images of the driver(s) of the vehicle(s) 100, 202a-202n, the data collection function 304 may collect captured images and optionally related data associated with the driver(s). Note that when data is collected for multiple vehicles 202a-202n (such as when the data collection, sampling, and generation operations are performed by the remote system 206), the data collection function 304 can collect real-world raw data for multiple, and possibly a very large number, of different environmental conditions or drivers associated with the vehicles 202a-202n.

The raw data that is collected by the data collection function 304 is sampled using a data sampling function 306, which generally operates to select a subset of the collected raw data for further use. For example, the data collection function 304 may select a subset of the collected raw data that satisfies one or more criteria, such as by selecting raw data that may be useful in training one or more machine learning models. The selected raw data is labeled using a data labeling function 308, which can generate labels (ground truths) associated with the raw data. The generated labels can vary based on the contents of the raw data being processed. Note that while the labeling here is shown as being an automated function, the labeling process could be implemented in a manual fashion in other embodiments. The labeled data is provided to a dataset management function 310, which generally operates to store the labeled data as one or more datasets in a database 312 or other suitable storage. For instance, the database 312 may be used to store training data previously used to train one or more machine learning models 110, and the dataset management function 310 may supplement or replace the previously-used training data with the labeled data received from the data labeling function 308. As a particular example, in some embodiments, the dataset management function 310 may create and maintain multiple datasets containing labeled data. One or some datasets can be used for training one or more machine learning models 110, and one or some other datasets can be used for testing or validating one or more trained machine learning models 110 after training.

A model training/testing function 314 generally operates to use data stored in the database 312 or other suitable storage to train and validate one or more machine learning models 110. For example, the model training/testing function 314 may use some of the labeled data in the database 312 as training data to train one or more machine learning models 110 in order to perform at least one specific function, such as one or more camera perception functions. As a particular example, the model training/testing function 314 may use backpropagation or other suitable training technique(s) to adjust weights or other parameters of the machine learning model(s) 110 based on the selected training data from the database 312. Once training is complete, the model training/testing function 314 may use additional labeled data from the database 312 (which typically includes data not used during training) to verify whether the trained machine learning model(s) 110 can accurately generate results. In some cases, this validation may involve determining whether the trained machine learning model(s) 110 can be accurate to within a desired threshold level. The model training/testing function 314 here can use any suitable techniques to train and test one or more machine learning models 110.

The results of the testing of the trained machine learning model(s) 110 (or other information such as feedback from one or more vehicles) can be provided to an edge case collection function 316, which generally operates to identify edge cases associated with the trained machine learning model(s) 110. As noted above, edge cases refer to instances where at least one trained machine learning model 110 generates incorrect results or results with low confidence (such as a confidence below a threshold value). For example, many trained machine learning models 110 are configured to generate output results based on or expressed as probabilities. As a particular example, a trained machine learning model 110 may output an identification of a particular characteristic of a vehicle's environment or driver as a collection of probabilities, where each probability identifies the likelihood that the particular characteristic has a specific value from among multiple values. The characteristic value with the highest probability can therefore be selected and used as the value for that particular characteristic. If the trained machine learning model 110 generates an incorrect value for a characteristic or generates a correct value for a characteristic but with a low confidence (probability) value, this may be identified as an edge case.

A similar edge case identification function 318 generally operates to identify additional instances or cases that are similar to the edge cases identified by the edge case collection function 316. For example, if the edge case collection function 316 identifies one or more edge cases related to the vehicle's driver, the similar edge case identification function 318 can identify one or more additional instances or cases that are the same as or similar to the identified edge case(s). Particular examples of this functionality are provided below. For illustration, one example usage of this functionality might involve identifying at least one additional driver pose that is similar to one or more driver poses associated with one or more edge cases identified by the edge case collection function 316.

The identified edge cases and the similar cases can be used by the processor 102 of the vehicle 100 or by the processing device 210 of the remote system 206 to perform active data collection, active data sampling, and active data generation. In this example, the identified edge cases and the similar cases can be used to generate information 320, where active data collection is performed based on the information 320. Here, the information 320 is fed back to the data collection function 304, and the information 320 allows the data collection function 304 to start collecting raw data related to the specific cases identified by the functions 316-318. Also, the identified edge cases and the similar cases can be used to generate information 322, where active data sampling is performed based on the information 322. Here, the information 322 is fed back to the data sampling function 306, and the information 322 allows the data sampling function 306 to start sampling raw data related to the specific cases identified by the functions 316-318. In addition, the identified edge cases and the similar cases can be used to generate information 324, where active data generation is performed based on the information 324. Here, the information 324 is fed back to a synthetic data generation function 326, which generally operates to produce synthetic or artificial training data. The information 324 allows the synthetic data generation function 326 to generate synthetic training data related to the specific cases identified by the functions 316-318.

The synthetic data generation function 326 may generate any suitable synthetic data that is useful for training or testing one or more machine learning models 110. For example, the synthetic data generation function 326 may generate synthetic images that appear to be captured by one or more cameras 104*a* of one or more vehicles 100, 202*a*-202*n*. As particular examples, the synthetic images may include artificial images of scenes that appear to be captured by one or more front-facing, rear-facing, or side-facing cameras 104*a* of one or more vehicles 100, 202*a*-202*n*. The synthetic images may also or alternatively include artificial images of drivers that appear to be captured by one or more driver-facing cameras 104*a* of one or more vehicles 100, 202*a*-202*n*. The synthetic data generation function 326 may use any suitable technique(s) to generate synthetic images or other synthetic data. For instance, various computer graphics-based techniques and neural rendering-based techniques have been developed for producing realistic (but synthetic) images of scenery or people, and any suitable one of these techniques may be used by the synthetic data generation function 326. As another example, the synthetic data generation function 326 may use images of real scenes or drivers and make modifications to the images in order to produce synthetic images. One specific example of this approach that may be used here is described in U.S. Patent Application No. 63/224,261 filed on Jul. 21, 2021 (which is hereby incorporated by reference in its entirety).

The following now describes specific examples of how active data collection, sampling, and generation may be used within the architecture 300 of FIG. 3. Note that the specific examples of the active data collection, sampling, and generation operations provided below are for illustration only and that any of the active data collection, sampling, and generation operations may be implemented in any other suitable manner. Also note that any single feature, any combination of features, or all of the features described below may be implemented within the architecture 300 or other suitable architecture.

With respect to active data collection, consider an example embodiment in which one or more machine learning models 110 are used to identify one or more characteristics of a driver of a vehicle 100, 202*a*-202*n*. In order to allow for usage of the one or more machine learning models 110 across a wide range of drivers, labeled training data is typically needed across a wide range of driver characteristics. Ideally, data collection is performed to obtain training data that satisfies at least one target distribution of driver-related data, such as when training data that is collected for drivers satisfies a desired age distribution, gender distribution, or ethnicity distribution. To support active data collection, identified failure or edge cases can be identified for one or more machine learning models 110, and real-world data having a distribution matching or similar to the distribution of the identified edge cases can be collected. The collection of real-world data by the data collection function 304 can therefore be controlled so that raw data having the desired distribution(s) is obtained. For instance, the collection of real-world data by the data collection function 304 can be controlled in order to obtain data having one or more desired distributions related to time, lighting conditions, geo-locations, driver ethnicity, driver gender, driver facial occlusions (like whether driver wear glasses or facial masks), the presence or absence of facial hair, and age. As a particular example of this, if a trained machine learning model 110 shows low confidence in determining a driver characteristic for drivers of a specific age range, the data collection function 304 can be controlled to collect additional images or other data for drivers of that age range across various times, lighting conditions, geo-locations, and so on.

With respect to active data sampling, the raw data that is collected during active collection may be related to one or more edge cases, but it is typically not the case that all of the raw data can or should be used for model training purposes. This is because (i) the collected raw data often contains many outliers and (ii) individual data points (images) can be highly correlated. Thus, active sampling can be used to selectively identify a subset of the collected raw data for use during subsequent model training and testing. Ideally, the subset of the collected raw data that is sampled represents efficient training data, which can be used to train one or more machine learning models 110 to be more effective as it relates to one or more edge cases. Depending on the circumstances, there may be many factors or a combination of factors that control how raw data should be sampled. Continuing with the example of one or more machine learning models 110 used to identify one or more characteristics of a driver of a vehicle 100, 202*a*-202*n*, the active sampling may be controlled based on the sizes of drivers in images, the locations of drivers in images, colors contained in the images, shapes of drivers or objects in images, confidence scores associated with determined characteristics of drivers in images, and poses of drivers in images. In some cases, active sampling may be performed to obtain images of drivers that are visually similar to images of drivers associated with edge cases. As a particular example, if an edge case is associated with an image containing a large view of the driver's face (where the resulting confidence score determined using that image is low), additional images containing larger views of drivers' faces can be sampled and subsequently used during model training or retraining.

With respect to active data generation, there are various techniques that can be used to generate synthetic (but photorealistic) images of scenes and drivers. Using any suitable technique or techniques, the synthetic data generation function 326 may be used to generate synthetic images based on or associated with identified edge cases. As noted above, the synthetic images may represent completely artificial images or real-world images that have been modified in one or more ways. The synthetic images can be generated to have the same or similar distribution(s) as the identified edge cases, and the synthetic images can be visually similar (but not identical) to images associated with the edge cases. The ability to generate synthetic images with known contents can allow for subsequent training or retraining of one or more machine learning models 110, which will (ideally) enable the trained or retrained machine learning model(s) 110 to be more effective particularly at the edge cases.

In some embodiments, the synthetic data generation function 326 can be used to synthesize one or more new target images that have visual similarities with one or more source images. In other words, given a source dataset S={S(1), S(2), . . . , S(n)} of edge cases, the synthetic data generation function 326 may generate one or more target datasets T1={T(1, 1), T(1, 2), . . . , T(1,n)}, T2={T(2, 1), T(2, 2), . . . , T(2,n)}, etc. using the concept of dissimilarity between two images or dissimilarity between two datasets. As an example, a dissimilarity function between two images can be defined by the Euclidean distance in a feature space between a feature vector associated with a source image s and a feature vector associated with a target image t. This Euclidean distance can be defined as:

$$\text{Dissimilarity of } (s, t) := \|\text{feat}(s) - \text{feat}(t)\|$$

Here, feat($\cdot$) represents a feature vector transform, and $\|\cdot\|$ represents an L2 norm. In some embodiments, the feature vector transform can be implemented by a neural network that takes an image as an input and returns an extracted feature vector. The generation of synthetic images based on this or other type of dissimilarity function can then be expressed as a problem of finding at least one target image that is similar to a source image, which in some cases can be solved using an optimization technique that minimizes the dissimilarity between a source image S(i) and a corresponding target image T(i, $\theta$) by finding control parameters $\theta$ that create the target image T(i, $\theta$). One example implementation of this technique can involve finding image generation parameters $\theta$ while minimizing the dissimilarity between the source and target images for all image pairs (i=1 to n), which may be based on the following expression:

$$\text{Find } \theta \ \min \sum\nolimits_{i=1}^{n} \text{dissimilarity}(S(i), T(i, \theta))$$

Here, $\theta$ represents a parameter set of an image processing algorithm, and dissimilarity(S(i), T(i)) represents the dissimilarity function between the $i^{th}$ source image S(i) and the $i^{th}$ target image T(i, $\theta$). The target image T(i, $\theta$) is a function of the parameter set $\theta$. For computer graphics-based or neural rendering-based techniques, the parameter set $\theta$ may include attributes such as pose angle (like pitch, yaw, and roll), driver ethnicity, eyelid closure level, facial position, facial hair presence, glasses/mask presence, and eye-gaze direction. A cost function can be minimized using an optimization algorithm, such as the Nelder-Mead simplex method. For techniques where real-world images are modified to produce synthetic images, the approaches described in U.S. Patent Application No. 63/224,261 or other approaches may be used to modify source images associated with edge cases to produce target images. Note that in any of the techniques used here, a single target image or multiple target images may be generated for each source image that is associated with an edge case.

As can be seen here, active data collection, sampling, and generation operations may be performed in order to obtain different types of data for model training and testing purposes. Ideally, these various operations can be controlled in order to increase or maximize the efficiency of the overall framework. In some cases, this may involve minimizing the overall cost since the costs or resources needed for performing data collection, data sampling, and data generation are not necessarily the same. For instance, a data collection task that involves human participants (such as image collection of actual drivers for training of machine learning models used for driver monitoring) is typically much more expensive than sampling or generation tasks, which may only involve computational resources. One possible approach for coordinating active data collection, sampling, and generation tasks may use a weighted combination of the three operations to produce a target number of images. In some cases, this weighted combination could be expressed as follows:

$$\#(T) = w_1\#(C) + w_2\#(S) + w_3\#(G)$$

Here, T represents a target dataset, C represents a dataset formed using active collection, S represents a dataset formed using active sampling, and G represents a dataset formed using active generation. Also, #($\cdot$) represents a number of data points (such as images) contained in a specific dataset. In addition, $w_1$, $w_2$, and $w_3$ represent weights (such as non-negative integers) applied to the different datasets. The actual weights that are used here may be tuned, such as based on experiments while considering actual costs of the three tasks and training efficiencies.

Data curation can also be performed to balance the usage of real-world and synthetic data during the training and testing processes. One example goal of data curation may be to mix real-world and synthetic data to increase or maximize the efficiency of model training. For example, it is known that training a machine learning model using synthetic data alone can limit the accuracy improvement achieved by the machine learning model. This is due to the domain gap between real-world and synthetic data. In other words, while synthetic data is useful, it often cannot span the complete range of characteristics captured in real-world data. In some cases, a weighted mixture of synthetic and real-world data can be obtained based on the active collection, sampling, and generation operations described above and used for model training or retraining. As a particular example, a weighted mixture of synthetic and real-world data may be defined as follows:

$$T = S \cup R$$

$$\#(S) = \mathrm{floor}(w\#(T))$$

$$\#(R) = \mathrm{floor}((1 - w)\#(T))$$

Here, T represents a target dataset, S represents a subset of a synthetic dataset, and R represents a subset of a real-world dataset. Also, w represents a weight having a value between zero and one (inclusive), where the weight is used to control the relative percentages of synthetic and real-world data in the target dataset. In addition, $\#(\cdot)$ represents a number of data points, and $\mathrm{floor}(\cdot)$ represents a function that returns the integer part of a real number. In some embodiments, the weight w represents a tunable parameter for the training/retraining task and can be used to increase or maximize the training accuracy.

As noted above, the active learning process may be initiated continuously, periodically, intermittently, on demand, or at any other suitable time(s). In some embodiments, once initiated, the active learning process may continue until one or more criteria are satisfied. In some cases, for instance, the edge case collection function 316 may include a decision component or other logic that determines if and when the active learning process stops. One goal for using active learning can be to expedite the learning process and reduce data collection, selection, labeling, and generation efforts. In particular embodiments, a stopping criterion for the active learning process may be based on determining if and when the edge case collection function 316 has reached maximum effectiveness during the active learning process.

As one example of this, the active learning process can be stopped in response to detecting that repeated data collection and training operations show little or no significant performance improvement during active learning (such as a performance improvement that is below a specified threshold level). A machine learning model's performance change can be a good signal to define a stopping criterion for active learning. For example, consider the case where unlabeled data does not have ground truths for evaluation, in which case an uncertainty sampling technique can be used. In uncertainty sampling techniques, the most uncertain unlabeled example can be viewed as the most informative instance to be chosen for each learning cycle. The uncertainty value of the chosen example is a good signal to reflect the confidence of the current machine learning model's performance for all unlabeled examples. If the uncertainty value of this chosen example is sufficiently small (such as below a threshold value), it can be assumed that the current machine learning model 110 has sufficient confidence in its classification of remaining unlabeled data, so the active learning process can stop. If the machine learning model 110 already has sufficient confidence on its classification of the remaining unlabeled data, it can be assumed that the current labeled data is sufficient to train the machine learning model 110 with maximum effectiveness. In other words, attempting to obtain the labels of the remaining unlabeled examples is not going to significantly improve the machine learning model's performance.

As another example of this, it is possible to check if there is any classification label change to unlabeled examples during two recent consecutive learning cycles (such as the immediately-preceding cycle and the current cycle). If a machine learning model 110 is stable, inference results from unlabeled examples are stable, and this information can be as a stopping criterion. Otherwise, the trained model 110 might provide different inference results (such as differently classified labels), which implies that the active learning process can continue. If there is no unlabeled example that can potentially change the decision boundaries of the machine learning model 110, getting the labels of these remaining unlabeled examples is unlikely to help the machine learning model 110 much, so the active learning process can stop. Labeling an unlabeled example may shift the decision boundaries if this example was previously at "left" of a boundary and is now at "right" (or vice versa). In other words, if an unlabeled example is assigned to two different labels during two adjacent learning cycles, it can be assumed that the labeling of this unlabeled example has a good chance to change the decision boundaries of the machine learning model 110. Once there is no such unlabeled example in the remaining pool, the active learning process becomes stable and can end.

As one particular example of this, assume a machine learning model 110 is used for driver monitoring, such as to identify the direction that a driver is looking while driving. Part of this process can involve identifying the driver's eyes, which can be referred to as an eye key point (landmark) detection process. The edge case collection function 316 may identify one or more instances in which the detection of a driver's eyes failed, and the similar edge case identification function 318 can identify similar cases. Collectively, these functions may identify a number of cases involving large yaw and pitch angles of drivers' faces relative to a camera, such as a yaw of −90° to −45° and +45° to +90° and a pitch of −30° to +30°, as well as cases involving the driver(s) wearing sunglasses. The active learning process can be repeated for eye landmarks detection (using real-world and synthetic data collected as described above) until no significant performance improvement is achieved by the machine learning model 110 during active learning.

Although FIG. 3 illustrates one example of an architecture 300 supporting active data collection, sampling, and generation for use in training at least one machine learning model, various changes may be made to FIG. 3. For example, various functions and components shown in FIG. 3 may be combined, further subdivided, replicated, omitted, or rearranged and additional functions and components may be added according to particular needs. Also, the architecture 300 may be implemented in any suitable centralized or decentralized manner.

Figure 4:
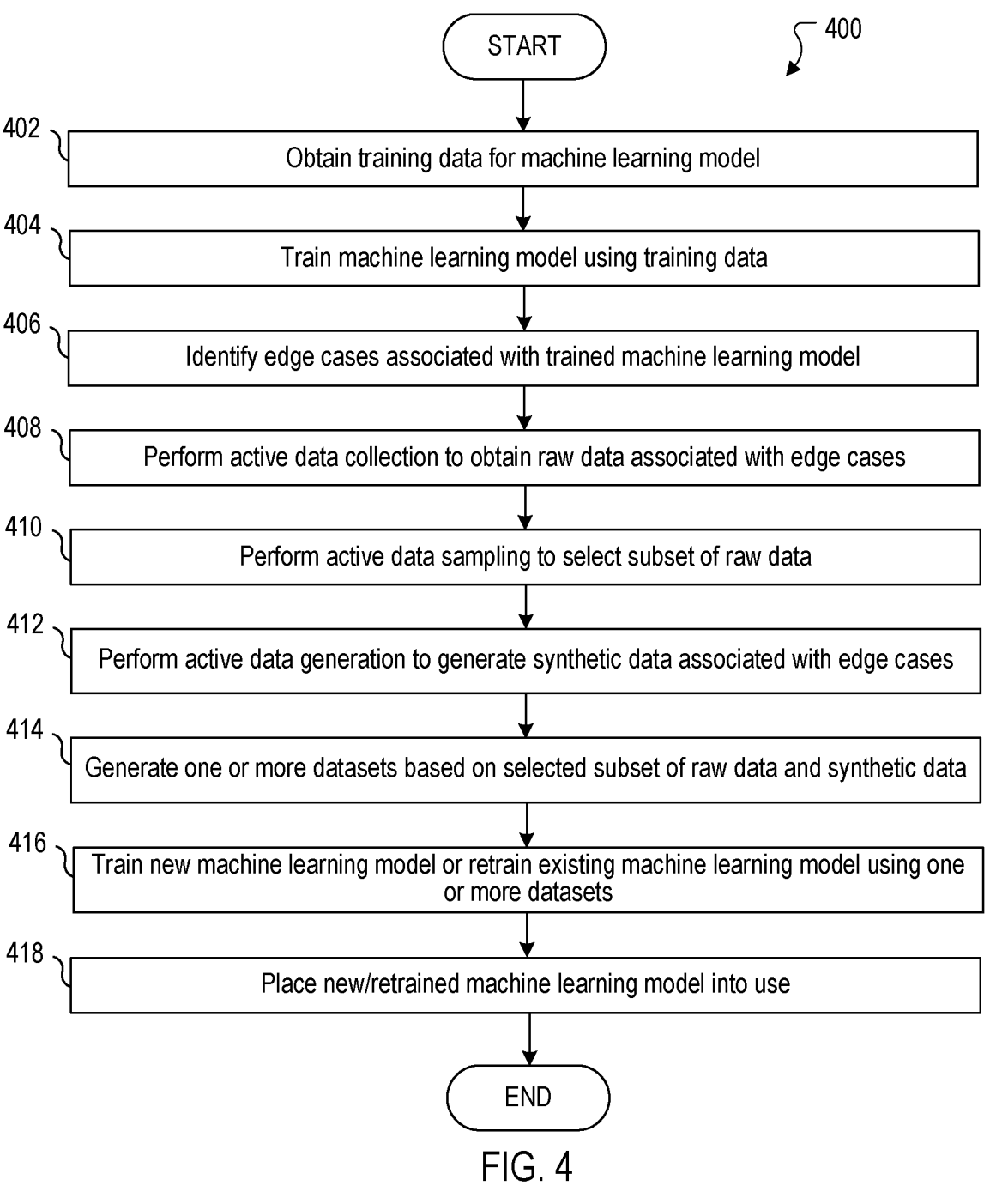
FIG. 4 illustrates an example method for active data collection, sampling, and generation for use in training at least one machine learning model according to this disclosure.

FIG. 4 illustrates an example method 400 for active data collection, sampling, and generation for use in training at least one machine learning model according to this disclosure. For ease of explanation, the method 400 shown in FIG. 4 may be described as being performed by the architecture 300 shown in FIG. 3, which can be used to at least partially implement the functionality of the ADAS feature module 108 in the vehicle 100 shown in FIG. 1 or to at least partially implement the functionality of the remote system 206 shown in FIG. 2. However, the method 400 shown in FIG. 4 may be performed using any other suitable device or system.

As shown in FIG. 4, training data for at least one machine learning model is obtained at step 402, and the at least one machine learning model is trained using the training data at step 404. This may include, for example, the processor 102 or the processing device 210 training at least one machine learning model 110 to perform one or more camera perception functions or other functions. The training data that is used here may be obtained from any suitable source(s), such as a public database, one or more cameras 104a of one or more vehicles 100, 202a-202n, or other source(s). The training data that is used here may also be labeled in any suitable manner, such as via an automated or manual process.

At least one edge case associated with the at least one trained machine learning model is identified at step 406. This may include, for example, the processor 102 or the processing device 210 identifying one or more instances where the at least one trained machine learning model 110 provides incorrect results or provides correct results but with low confidence. In some cases, the edge cases may be identified during validation of the at least one trained machine learning model 110, where labeled data is provided to the at least one trained machine learning model 110 in order to determine whether the at least one trained machine learning model 110 produces accurate results. Also, in some cases, this may include the processor 102 or the processing device 210 identifying any cases that are similar to the identified edge case(s).

Active data collection is performed to collect raw data associated with the at least one edge case (and optionally any identified similar cases) at step 408, and active data sampling is performed to select a suitable subset of the raw data at step 410. This may include, for example, the processor 102 or the processing device 210 identifying at least one target distribution of vehicle-related or driver-related data to be collected for one or more edge cases. This may also include the processor 102 or the processing device 210 collecting images or other data having the at least one target distribution of vehicle-related or driver-related data. As noted above, the images or other data may be collected from a single vehicle 100 or from multiple vehicles 202a-202n depending on the implementation. Active data generation is performed to generate synthetic data associated with the at least one edge case (and optionally any identified similar cases) at step 412. This may include, for example, the processor 102 or the processing device 210 generating synthetic images or other synthetic data associated with one or more edge cases. As particular examples, this may include the processor 102 or the processing device 210 generating synthetic images that are visually similar to one or more images associated with one or more edge cases. As noted above, the synthetic images may include any suitable artificial images, such as completely artificial images or images representing modified versions of real-world images.

One or more datasets are generated based on the selected subset of raw data and the synthetic data at step 414. This may include, for example, the processor 102 or the processing device 210 generating at least one dataset containing images obtained via active data collection and active data sampling and synthetic images obtained via active data generation. In some cases, at least one dataset may include a weighted combination of real-world and synthetic data. In some cases, the at least one dataset may include the training data previously used to train the at least one machine learning model 110. Also, in some cases, multiple datasets may be generated, such as one or more datasets to be used for additional model training and one or more datasets to be used for additional model validation.

At least one existing machine learning model can be retrained or at least one new machine learning model can be trained using the one or more datasets at step 416. This may include, for example, the processor 102 or the processing device 210 training or retraining at least one machine learning model 110 to perform the one or more camera perception functions or other functions. This may also include the processor 102 or the processing device 210 validating the at least one trained machine learning model 110. Ideally, the inclusion of the actively-obtained data in the one or more datasets can help the at least one trained machine learning model 110 operate more accurately, particularly with respect to the edge cases. Assuming the at least one trained machine learning model is validated, the at least one trained machine learning model can be placed into use at step 418. This may include, for example, the processor 102 providing the at least one trained machine learning model 110 to the ADAS feature module 108 for use. This may also or alternatively include the processing device 210 of the remote system 206 providing the at least one trained machine learning model 110 to one or more vehicles 202a-202n (which may then provide the at least one trained machine learning model 110 to their ADAS feature modules 108).

Although FIG. 4 illustrates one example of a method 400 for active data collection, sampling, and generation for use in training at least one machine learning model, various changes may be made to FIG. 4. For example, while shown as a series of steps, various steps in FIG. 4 may overlap, occur in parallel, occur in a different order, or occur any number of times. As a particular example, at least some of the steps shown in FIG. 4 may be performed or repeated continuously, periodically, intermittently, on demand, or at any other suitable time(s) in order to update one or more machine learning models 110 used by one or more vehicles 100, 202a-202n.

Note that many functional aspects of the embodiments described above can be implemented using any suitable hardware or any suitable combination of hardware and software/firmware instructions. In some embodiments, at least some functional aspects of the embodiments described above can be embodied as software instructions that are executed by one or more unitary or multi-core central processing units or other processing device(s). In other embodiments, at least some functional aspects of the embodiments described above can be embodied using one or more application specific integrated circuits (ASICs). When implemented using one or more ASICs, any suitable integrated circuit design and manufacturing techniques may be used, such as those that can be automated using electronic design automation (EDA) tools. Examples of such tools include tools provided by SYNOPSYS, INC., CADENCE DESIGN SYSTEMS, INC., and SIEMENS EDA.

Figure 5:
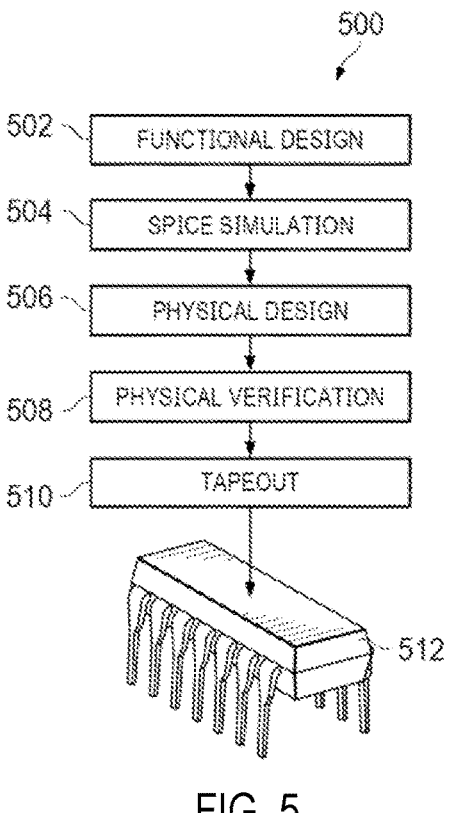
FIG. 5 illustrates an example design flow for employing one or more tools to design hardware that implements one or more functions according to this disclosure.

FIG. 5 illustrates an example design flow 500 for employing one or more tools to design hardware that implements one or more functions according to this disclosure. More specifically, the design flow 500 here represents a simplified ASIC design flow employing one or more EDA tools or other tools for designing and facilitating fabrication of ASICs that implement at least some functional aspects of the various embodiments described above.

As shown in FIG. 5, a functional design of an ASIC is created at step 502. For any portion of the ASIC design that is digital in nature, in some cases, this may include expressing the digital functional design by generating register transfer level (RTL) code in a hardware descriptive language (HDL), such as VHDL or VERILOG. A functional verification (such as a behavioral simulation) can be performed on HDL data structures to ensure that the RTL code that has been generated is in accordance with logic specifications. In other cases, a schematic of digital logic can be captured and used, such as through the use of a schematic capture program. For any portion of the ASIC design that is analog in nature, this may include expressing the analog functional design by generating a schematic, such as through the use of a schematic capture program. The output of the schematic capture program can be converted (synthesized), such as into gate/transistor level netlist data structures. Data structures or other aspects of the functional design are simulated, such as by using a simulation program with integrated circuits emphasis (SPICE), at step 504. This may include, for example, using the SPICE simulations or other simulations to verify that the functional design of the ASIC performs as expected.

A physical design of the ASIC is created based on the validated data structures and other aspects of the functional design at step 506. This may include, for example, instantiating the validated data structures with their geometric representations. In some embodiments, creating a physical layout includes "floor-planning," where gross regions of an integrated circuit chip are assigned and input/output (I/O) pins are defined. Also, hard cores (such as arrays, analog blocks, inductors, etc.) can be placed within the gross regions based on design constraints (such as trace lengths, timing, etc.). Clock wiring, which is commonly referred to or implemented as clock trees, can be placed within the integrated circuit chip, and connections between gates/analog blocks can be routed within the integrated circuit chip. When all elements have been placed, a global and detailed routing can be performed to connect all of the elements together. Post-wiring optimization may be performed to improve performance (such as timing closure), noise (such as signal integrity), and yield. The physical layout can also be modified where possible while maintaining compliance with design rules that are set by a captive, external, or other semiconductor manufacturing foundry of choice, which can make the ASIC more efficient to produce in bulk. Example modifications may include adding extra vias or dummy metal/diffusion/poly layers.

The physical design is verified at step 508. This may include, for example, performing design rule checking (DRC) to determine whether the physical layout of the ASIC satisfies a series of recommended parameters, such as design rules of the foundry. In some cases, the design rules represent a series of parameters provided by the foundry that are specific to a particular semiconductor manufacturing process. As particular examples, the design rules may specify certain geometric and connectivity restrictions to ensure sufficient margins to account for variability in semiconductor manufacturing processes or to ensure that the ASICs work correctly. Also, in some cases, a layout versus schematic (LVS) check can be performed to verify that the physical layout corresponds to the original schematic or circuit diagram of the design. In addition, a complete simulation may be performed to ensure that the physical layout phase is properly done.

After the physical layout is verified, mask generation design data is generated at step 510. This may include, for example, generating mask generation design data for use in creating photomasks to be used during ASIC fabrication. The mask generation design data may have any suitable form, such as GDSII data structures. This step may be said to represent a "tape-out" for preparation of the photomasks. The GDSII data structures or other mask generation design data can be transferred through a communications medium (such as via a storage device or over a network) from a circuit designer or other party to a photomask supplier/maker or to the semiconductor foundry itself. The photomasks can be created and used to fabricate ASIC devices at step 512.

Although FIG. 5 illustrates one example of a design flow 500 for employing one or more tools to design hardware that implements one or more functions, various changes may be made to FIG. 5. For example, at least some functional aspects of the various embodiments described above may be implemented in any other suitable manner.

Figure 6:
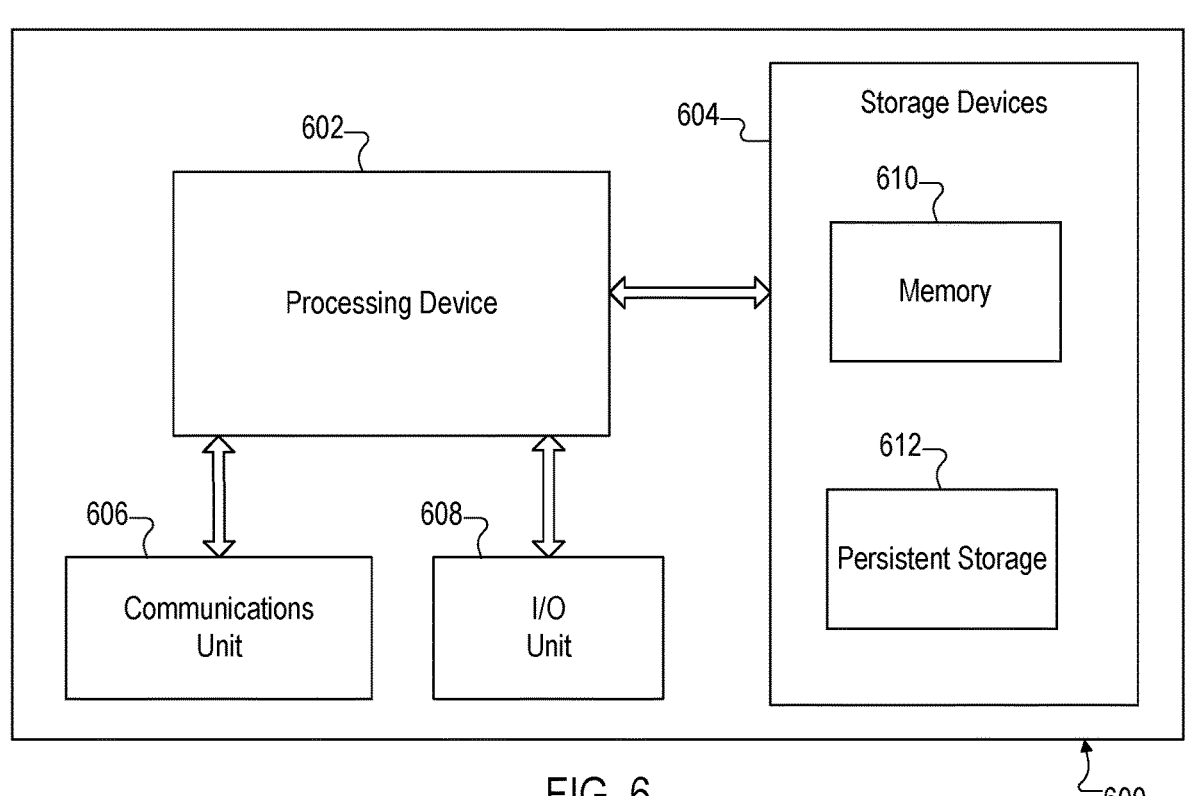
FIG. 6 illustrates an example device supporting execution of one or more tools to design hardware that implements one or more functions according to this disclosure.

FIG. 6 illustrates an example device 600 supporting execution of one or more tools to design hardware that implements one or more functions according to this disclosure. The device 600 may, for example, be used to implement at least part of the design flow 500 shown in FIG. 5. However, the design flow 500 may be implemented in any other suitable manner.

As shown in FIG. 6, the device 600 denotes a computing device or system that includes at least one processing device 602, at least one storage device 604, at least one communications unit 606, and at least one input/output (I/O) unit 608. The processing device 602 may execute instructions that can be loaded into a memory 610. The processing device 602 includes any suitable number(s) and type(s) of processors or other processing devices in any suitable arrangement. Example types of processing devices 602 include one or more microprocessors, microcontrollers, DSPs, ASICs, FPGAs, or discrete circuitry.

The memory 610 and a persistent storage 612 are examples of storage devices 604, which represent any structure(s) capable of storing and facilitating retrieval of information (such as data, program code, and/or other suitable information on a temporary or permanent basis). The memory 610 may represent a random access memory or any other suitable volatile or non-volatile storage device(s). The persistent storage 612 may contain one or more components or devices supporting longer-term storage of data, such as a read only memory, hard drive, Flash memory, or optical disc.

The communications unit 606 supports communications with other systems or devices. For example, the communications unit 606 can include a network interface card or a wireless transceiver facilitating communications over a wired or wireless network. The communications unit 606 may support communications through any suitable physical or wireless communication link(s).

The I/O unit 608 allows for input and output of data. For example, the I/O unit 608 may provide a connection for user input through a keyboard, mouse, keypad, touchscreen, or other suitable input device. The I/O unit 608 may also send output to a display or other suitable output device. Note, however, that the I/O unit 608 may be omitted if the device 600 does not require local I/O, such as when the device 600 represents a server or other device that can be accessed remotely.

The instructions that are executed by the processing device 602 include instructions that implement at least part of the design flow 500. For example, the instructions that are executed by the processing device 602 may cause the processing device 602 to generate or otherwise obtain functional designs, perform simulations, generate physical designs, verify physical designs, perform tape-outs, or create/use photomasks (or any combination of these functions). As a result, the instructions that are executed by the processing device 602 support the design and fabrication of ASIC devices or other devices that implement one or more functions described above.

Although FIG. 6 illustrates one example of a device 600 supporting execution of one or more tools to design hardware that implements one or more functions, various changes may be made to FIG. 6. For example, computing and communication devices and systems come in a wide variety of configurations, and FIG. 6 does not limit this disclosure to any particular computing or communication device or system.

In some embodiments, various functions described in this patent document are implemented or supported using machine-readable instructions that are stored on a non-transitory machine-readable medium. The phrase "machine-readable instructions" includes any type of instructions, including source code, object code, and executable code. The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later over-written.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
identifying one or more edge cases associated with at least one trained machine learning model, the at least one trained machine learning model configured to perform at least one function related to one or more vehicles;
obtaining non-edge case data having features that are visually similar to the identified one or more edge cases;
obtaining raw data associated with the one or more edge cases and the non-edge case data from at least one of the one or more vehicles;
selecting a subset of the raw data, including identifying a target distribution of data related to both the one or more edge cases and the non-edge case data;
generating synthetic data associated with both the one or more edge cases and the non-edge case data; and
performing at least one of:
retraining the at least one trained machine learning model; or
training at least one new machine learning model using the selected subset of the raw data and the synthetic data.

2. The method of claim 1, wherein:
the at least one trained machine learning model represents at least one model previously trained using a training dataset that comprises multiple first images;
the raw data comprises multiple second images captured using one or more cameras of the at least one of the one or more vehicles; and
the synthetic data comprises multiple third images representing at least one of artificial images and modified versions of captured images associated with the one or more edge cases.

3. The method of claim 2, wherein:
the at least one trained machine learning model is configured to perform at least one camera perception function in the one or more vehicles; and
the second images comprise images of one or more drivers.

4. The method of claim 2, further comprising:
generating one or more datasets containing at least some of the first, second, and third images,
wherein the retraining of the at least one trained machine learning model or the training of the at least one new machine learning model is based on the one or more datasets.

5. The method of claim 1, wherein the one or more edge cases represent one or more instances in which the at least one trained machine learning model provides incorrect results or provides correct results having a confidence below a threshold.

6. The method of claim 1, wherein obtaining the raw data associated with the one or more edge cases comprises obtaining the raw data from multiple vehicles, the raw data satisfying at least one target distribution of vehicle-related or driver-related data.

7. The method of claim 1, wherein the at least one trained machine learning model is trained to perform at least one of object detection, object classification, semantic segmentation, interesting point detection, pose estimation, and driver monitoring for the one or more vehicles.

8. An apparatus comprising:
at least one processing device configured to:
identify one or more edge cases associated with at least one trained machine learning model, the at least one trained machine learning model configured to perform at least one function related to one or more vehicles;
obtain non-edge case data having features that are visually similar to the identified one or more edge cases;
obtain raw data associated with the one or more edge cases and the non-edge case data from at least one of the one or more vehicles;
select a subset of the raw data, wherein the at least one processing device is configured to identify a target distribution of data related to both the one or more edge cases and the non-edge case data;
generate synthetic data associated with both the one or more edge cases and the non-edge case data; and
perform at least one of:
retrain the at least one trained machine learning model; or
train at least one new machine learning model using the selected subset of the raw data and the synthetic data.

9. The apparatus of claim 8, wherein:
the at least one trained machine learning model represents at least one model previously trained using a training dataset that comprises multiple first images;
the raw data comprises multiple second images captured using one or more cameras of the at least one of the one or more vehicles; and
the synthetic data comprises multiple third images representing at least one of artificial images and modified versions of captured images associated with the one or more edge cases.

10. The apparatus of claim 9, wherein:
the at least one trained machine learning model is configured to perform at least one camera perception function in the one or more vehicles; and
the second images comprise images of one or more drivers.

11. The apparatus of claim 9, wherein:
the at least one processing device is further configured to generate one or more datasets containing at least some of the first, second, and third images; and
the at least one processing device is configured to retrain the at least one trained machine learning model or train the at least one new machine learning model based on the one or more datasets.

12. The apparatus of claim 8, wherein the one or more edge cases represent one or more instances in which the at least one trained machine learning model provides incorrect results or provides correct results having a confidence below a threshold.

13. The apparatus of claim 8, wherein the at least one processing device is configured to obtain the raw data associated with the one or more edge cases from multiple vehicles, the raw data satisfying at least one target distribution of vehicle-related or driver-related data.

14. The apparatus of claim 8, wherein the at least one trained machine learning model is trained to perform at least one of object detection, object classification, semantic segmentation, interesting point detection, pose estimation, and driver monitoring for the one or more vehicles.

15. A non-transitory machine-readable medium containing instructions that when executed cause at least one processor to:
identify one or more edge cases associated with at least one trained machine learning model, the at least one trained machine learning model configured to perform at least one function related to one or more vehicles;
obtain non-edge case data having features that are visually similar to the identified one or more edge cases;
obtain raw data associated with the one or more edge cases and the non-edge case data from at least one of the one or more vehicles;
select a subset of the raw data, including performing an identification of a target distribution of data related to both the one or more edge cases and the non-edge case data;
generate synthetic data associated with both the one or more edge cases and the non-edge case data; and
perform at least one of:
retrain the at least one trained machine learning model; or
train at least one new machine learning model using the selected subset of the raw data and the synthetic data.

16. The non-transitory machine-readable medium of claim 15, wherein:
the at least one trained machine learning model represents at least one model previously trained using a training dataset that comprises multiple first images;
the raw data comprises multiple second images captured using one or more cameras of the at least one of the one or more vehicles; and
the synthetic data comprises multiple third images representing at least one of artificial images and modified versions of captured images associated with the one or more edge cases.

17. The non-transitory machine-readable medium of claim 16, wherein:
the at least one trained machine learning model is configured to perform at least one camera perception function in the one or more vehicles; and
the second images comprise images of one or more drivers.

18. The non-transitory machine-readable medium of claim 15, wherein the one or more edge cases represent one or more instances in which the at least one trained machine learning model provides incorrect results or provides correct results having a confidence below a threshold.

19. The non-transitory machine-readable medium of claim 15, wherein the instructions that when executed cause the at least one processor to obtain the raw data associated with the one or more edge cases comprises:
instructions that when executed cause the at least one processor to obtain the raw data associated with the one or more edge cases from multiple vehicles, the raw data satisfying at least one target distribution of vehicle-related or driver-related data.

20. The non-transitory machine-readable medium of claim 15, wherein the at least one trained machine learning model is trained to perform at least one of object detection, object classification, semantic segmentation, interesting point detection, pose estimation, and driver monitoring for the one or more vehicles.

21. The non-transitory machine-readable medium of claim 15, further containing instructions that when executed cause the at least one processor to continue an active learning process that includes identifying the one or more edge cases, obtaining the raw data, selecting the subset of the raw data, generating the synthetic data, and at least one of retraining the at least one trained machine learning model and training the at least one new machine learning model until a decision is made to stop the active learning process.

22. The non-transitory machine-readable medium of claim 21, wherein the decision to stop the active learning process is based on at least one of:

a determination that an uncertainty value associated with a prediction by the at least one trained machine learning model based on unlabeled training data is below a threshold value; and a determination that labels generated by the at least one trained machine learning model based on unlabeled training data during multiple consecutive training iterations match one another.

\* \* \* \* \*